(12) United States Patent
Horn

(10) Patent No.: US 6,922,903 B2
(45) Date of Patent: Aug. 2, 2005

(54) METHOD AND APPARATUS FOR MEASURING BENT WORKPIECES

(75) Inventor: Armin Horn, Ditzingen (DE)

(73) Assignee: Trumpf Werkzeugmaschinen GmbH+Co. KG (DE)

( * ) Notice: Subject to any disclaimer, the term of this patent is extended or adjusted under 35 U.S.C. 154(b) by 9 days.

(21) Appl. No.: 10/660,042

(22) Filed: Sep. 11, 2003

(65) Prior Publication Data

US 2004/0128846 A1 Jul. 8, 2004

(30) Foreign Application Priority Data

Sep. 11, 2002 (EP) .......................................... 02 020 284

(51) Int. Cl.⁷ .............................................. B21C 51/00
(52) U.S. Cl. .......................... 33/549; 33/1 N; 33/534; 72/31.1; 72/389.5; 382/152; 356/138
(58) Field of Search .......................... 33/549, 1 N, 534, 33/531, 532; 72/31.01, 31.1, 389.5, 389.6, 702; 382/141, 152; 348/86, 88; 356/634, 138, 141.2

(56) References Cited

U.S. PATENT DOCUMENTS

| | | | | |
|---|---|---|---|---|
| 3,943,632 A | * | 3/1976 | Albertazzi | 33/549 |
| 4,660,293 A | | 4/1987 | Kovacs | |
| 5,046,852 A | * | 9/1991 | Hametner et al. | 356/398 |
| 5,099,666 A | * | 3/1992 | Sartorio et al. | 72/18.1 |
| 5,329,597 A | * | 7/1994 | Kouno et al. | 382/152 |
| 5,375,340 A | * | 12/1994 | Gerritsen | 33/534 |
| 5,483,750 A | * | 1/1996 | Ooenoki et al. | 33/534 |
| 5,531,087 A | * | 7/1996 | Kitabayashi et al. | 72/37 |
| 5,603,236 A | * | 2/1997 | Hongo | 72/319 |
| 5,661,671 A | * | 8/1997 | Ooenoki et al. | 703/7 |
| 5,799,530 A | * | 9/1998 | Nagasawa | 72/389.3 |
| 5,842,366 A | | 12/1998 | Klingel et al. | |
| 5,857,366 A | * | 1/1999 | Koyama | 72/31.1 |
| 5,899,964 A | * | 5/1999 | Ooenoki et al. | 702/150 |
| 5,980,085 A | * | 11/1999 | Uemura et al. | 700/97 |
| 6,035,242 A | * | 3/2000 | Uemura et al. | 700/97 |
| 6,163,374 A | * | 12/2000 | Otani et al. | 356/152.1 |
| 6,289,598 B1 | | 9/2001 | Tanabe | |
| 6,473,537 B1 | * | 10/2002 | Yamada | 382/286 |
| 6,480,269 B2 | * | 11/2002 | Brinkman et al. | 356/138 |
| 6,722,181 B2 | * | 4/2004 | Nagakura | 72/461 |
| 6,727,986 B1 | * | 4/2004 | Serruys | 356/152.1 |
| 2001/0049953 A1 | | 12/2001 | Nagasawa | |

FOREIGN PATENT DOCUMENTS

| CA | 2365490 A1 | 7/2002 |
|---|---|---|
| DE | 4312565 A1 | 10/1994 |

* cited by examiner

Primary Examiner—Christopher W. Fulton
Assistant Examiner—Amy R. Cohen
(74) Attorney, Agent, or Firm—Pepe & Hazard LLP

(57) ABSTRACT

A method and device for determining the length (b) of at least one of two legs (13, 14), of a workpiece (12) bent toward each other at a bending angle ($\beta$) requires location of the workpiece (12) in a defined position. The position of the bending angle vertex (S) and the position of the end (E) of the leg (13, 14) to be measured are determined. Based on the position of the bending angle vertex (S) and of the end (E), the length (b) is calculated as the distance between the bending angle vertex (S) and the end (E). The measuring apparatus includes a system serving to determine the position of the bending angle vertex (S), a unit serving to determine the position of the end (E) and an evaluation unit which, based on the position of the bending angle vertex (S) and of the end (E), calculates the length (b) as the distance between the bending angle vertex (S) and the end (E).

25 Claims, 4 Drawing Sheets

METHOD AND APPARATUS FOR MEASURING BENT WORKPIECES

BACKGROUND

This invention relates to a method and apparatus for determining the length of at least one of two legs of a part, which legs have been bent toward each other by means of a bending tool at a bending angle whose vertex is at the point of intersection of the straight, angle defining projections of the legs of the bent part, with one end of the leg to be measured delimiting the latter on the far side opposite the vertex of the bending angle. The invention further relates to a method and a device for bending workpieces utilizing the aforementioned method and apparatus for determining the length of the leg of a bent part.

Excluding the bending angle, the length of the legs is the most important functional measure of a bent part. The conventional method heretofore used to determine the length of a leg of a part bent in a bending machine has been to take the part out of the bending machine and measure it manually. The accuracy of that measurement of the length is compromised primarily by the fact that, at the apex of the bent part, the legs that are to be measured do not meet in an ideal, straight line but instead converge in an arcuate contour or radiused fashion. Thus, the vertex of the bending angle does not really constitute one of the end points of the leg of a bent part and the point of intersection of the straight projections of both legs. Therefore, it is not possible, for instance, to directly gauge the vertex of the bending angle within the determination of the length of the leg of a bent part. Particular difficulties that can be overcome only by means of complex metrology are encountered in the case of open bending angles, i.e., included angles of more than 90°.

It is an objective of this invention to provide apparatus that permits an automated and highly accurate determination of the length of the legs of bent parts with a particular view to the optimization of the workpiece bending processes.

Another objective is to provide a method which accurately and quickly measures the length of the legs of the bent parts.

SUMMARY OF THE INVENTION

It has now been found that the foregoing and related objects can be readily attained in a method for determining the length (b) of at least one of two legs (13, 14) of a workpiece (12), which have been bent toward each other by means of a bending die (6) at a bending angle ($\beta$) whose vertex (S) is located at the point of intersection of the straight, angle forming projections (29, 30) of the legs (13, 14) of the bent part (12), with one end (E) of the leg (13, 14) to be measured limiting the latter on the far side opposite the bending angle vertex (S). The method includes the steps of (a) holding the object part (12) in the bending die (6); (b) determining the position of the bending angle vertex (S) and the position of the end (E) of the leg (13, 14); and (c) from the respective position of the bending angle vertex (S) and of the end (E) thus determined, calculating the length (b) of the leg as the distance between the bending angle vertex (S) and the end (E).

The position of the bending angle vertex (S) is determined by initially determining the bending angle ($\beta$). During the step of determining the position of the bending angle vertex (S), the workpiece (12) is supported on a backing surface (27,28) and the position of the bending angle vertex (S) is determined on the basis of the position in which the workpiece (12) is supported on the backing surface (27, 28).

Preferably, the position of the bending angle vertex (S) is determined by measuring the bending angle ($\beta$) by optical means and the position of the end of the leg (13,14) of the workpiece (12) is determined by optical means.

In a method for bending workpieces wherein two angular legs (13, 14) of a workpiece are bent toward each other in a bending die (6) at a bending angle ($\beta$) to produce a bent workpiece (12), the length (b) of at least one of the said legs (13, 14) is determined with a bending angle vertex (S) located at the point of intersection of the straight projections (29, 30) of the legs that form the angle ($\beta$) of the legs (13, 14) of the workpiece (12) and with the end (E) of the leg (13, 14) delimiting the latter on the far side from the bending angle vertex (S). The actual value obtained as a result of the determination of the length (b) of a leg (13, 14) is compared to a leg length set point value and from the result of said actual value/set point value comparison is used to define at least one parameter of significance for the length (b) in a subsequent bending step.

The control apparatus includes (a) a system (31) for determining the position of the bending angle vertex (S), (b) a unit (34) for determining the position of the end (E), and (c) an evaluation unit (36), the system (31) and unit (34) permitting the determination of the position of the bending angle vertex (S) and the position of the end (E) of a bent workpiece (12) held in the bending die (6) in a defined position, and the evaluation unit (36) processes data on the position of the bending angle vertex (S) and of the end (E) to determine the length (b) as the distance between the bending angle vertex (S) and the end (E).

Preferably, a retaining element is provided for the determination of the position of the bending angle vertex (S) and the determination of the position of the end (E), with the workpiece (12) being held in specifically defined fashion in the bending die (6). The system (31) for determining the position of the bending angle vertex (S) includes a unit (9) serving to measure the bending angle ($\beta$) as well as a processor that connects to the unit (9) measuring the bending angle ($\beta$) and to the evaluation unit (36). The processor (32) determines the position of the bending angle vertex (S) on the basis of the bending angle ($\beta$) thus measured. The system (31) for determining the position of the bending angle vertex (S) includes a processor (32) connected to the evaluation unit (36), and a backing surface (27, 28) supporting the workpiece (12) for the determination of the position of the bending angle vertex (S). The processor (32) determines the position of the bending angle vertex (S) on the basis of the position of the support for the workpiece (12) on the backing surface (27, 28).

Preferably, the unit measuring the bending angle ($\beta$) is an optical measuring tool. The detection and acquisition unit serving to capture the position of the end (E) may include a tactile contact sensor assembly that can be brought into contact with the end (E). This contact sensor assembly in contact with the end (E) is capable of moving with the end (E) during the bending process. Desirably, the contact sensor assembly comprises a positioning stop lug (17, 18) for the workpiece to be bent.

Preferably, the detection and acquisition unit (20, 21) serving to capture the position of the end (E) is an optical image acquisition unit (20, 21).

Ideally, the detection and acquisition unit (34) serving to capture the position of the end (E) is constituted of a positioning stop (17, 18) of the bending device against which the workpiece can be set for appropriate positioning relative to the bending die (6) prior to being processed. The positioning stop (17, 18) is preferably movable by the control system (11). By including an evaluation unit (36) as a part of a system controller (11) in which at least one set point value for the length (b) is stored and by means of which an actual length value can be compared against a length set point value, and, on the basis of the result of the actual versus set point length comparison, at least one parameter controlling the length (b) in at least one subsequent bending operation can be defined.

As can be readily appreciated, the bent part that is to be measured remains in the bending tool where it is held in a particular, defined position. To obtain as accurate a measurement as possible, the length of the leg of interest is measured not directly but by way of the position of the angular vertex and the position of the end of the leg. The position of the vertex of the bending angle is used as the intersection, really nonexistent, of the linear projections of the converging legs of the object part.

The bent part to be measured is retained in the bending tool and held in a defined position. In terms of hardware, this procedural aspect is accomplished by means of the retaining element described herein. In a preferred design version of the bending device according to the invention, however, the bending tool itself serves as the retaining element for the defined positioning of the object part.

An advantageous configuration of the invention determines the position of the vertex of the bending angle is determined by establishing the degree of the bending angle. The bending angle can be established in various ways. For example, it can be physically measured. Alternatively, it can be computed by a so-called "bending formula" stored in a system control unit, and the bending formula describes the bending angle as a function of workpiece and tool related parameters.

The length of the leg is determined by supporting the object part on a backstop and the position of the angular vertex is determined on the basis of the position of the bent part relative to that backstop. In the same way as the bending angle, the support position of the bent part relative to the backstop serves as a basis, attainable with the necessary degree of accuracy and with conventional means, for establishing the position of the vertex of the bending angle. Therefore, the apparatus embodying this invention is equipped with a processor that connects to an evaluation unit and with a backstop that supports the bent part to permit the determination of the vertex of the bending angle. The processor computes the position of the vertex of the bending angle on the basis of the support of the object part relative to the backstop. In a preferred configuration of the bending device according to this invention, the bending tool serves as the backstop supporting the bent part for the determination of the position of the bending angle vertex.

Preferably, the present invention provides for the use of non-contact and in particular optical determination of the bending angle and/or the position of the vertex of the bending angle. Possible ways for implementation include the split-beam method, i.e. the use of a split-beam system. As an alternative or in addition, tactile methods and systems may be used.

As an example, the measuring system is a contact-sensing unit which can be set against the end of the leg for determining the length of the leg. That contact sensor may be movable to allow it to follow the end of the leg as it is in motion. In particular, the positioning stop for the workpiece to be bent can be used to hold the contact sensor.

Desirably, the bending device uses a positioning stop which serves to keep the workpiece to be processed in position relative to the bending tool, and holds the contact sensor of the measuring unit for the purpose of determining the position of the end of the leg. The positioning stop may also serve to hold a non-contact and especially optical sensing unit for determining the position of the end of the leg. Preferably, the positioning stop can be moved by the control system.

In a preferred bending method and bending device, the actual result of the measurement of the length of a leg is compared with a predefined length set point value, and the result of this actual value/set point value comparison is used to define at least one length related parameter for at least one subsequent bending step. One such parameter to be defined would be the distance at which positioning stops for the workpiece to be bent need to be set relative to the bending line defined by the bending tool. Subsequent bending steps may involve other workpieces or the same workpiece whose angular length had been determined as the basis for the subsequent parameter definition. Significantly, this invention makes it possible in the case of bent parts with multiple bends to define the parameters of the individual bending operations on the basis of each respectively preceding actual length versus set point value comparison in such a fashion that the sum of the individual leg lengths matches the overall production tolerance specified for the bent part.

BRIEF DESCRIPTION OF ATTACHED DRAWINGS

DETAILED DESCRIPTION OF ILLUSTRATED EMBODIMENT

Figure 1:
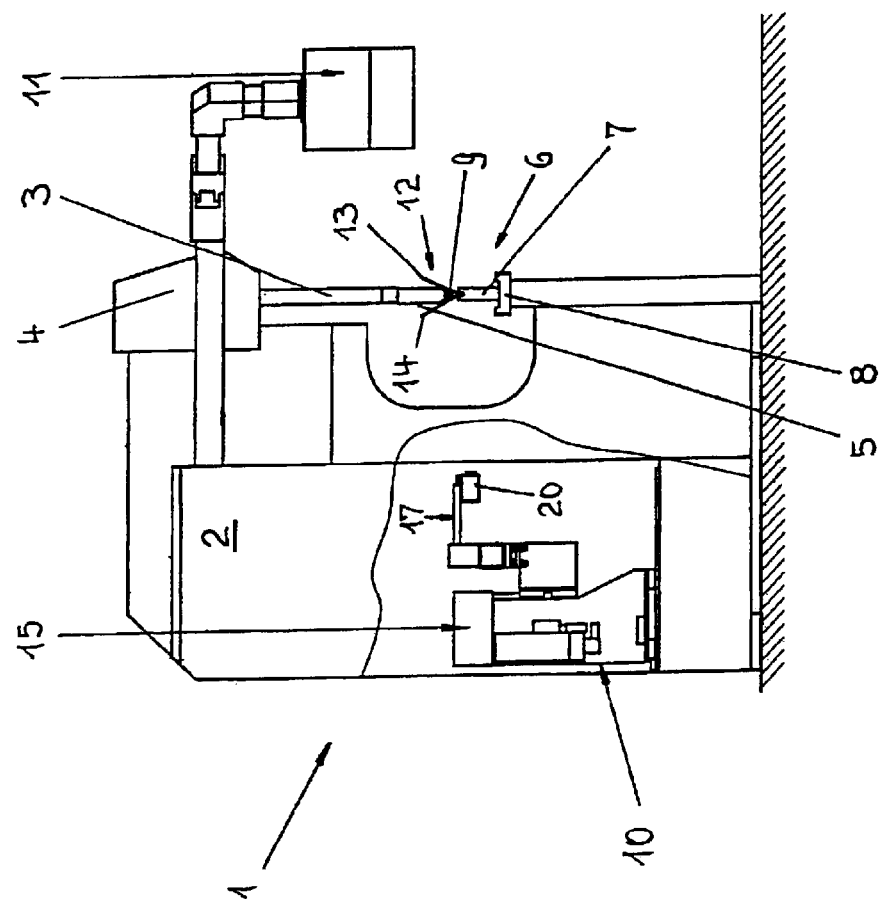
FIG. 1 is a diagrammatic side elevational view of a computer-controlled bending machine embodying the present invention including a bending die and a rear stop system.

As shown in FIG. 1, a bending machine generally designated by the numeral 1 for sheet metal processing encompasses a machine frame 2 on which a bending beam 3 is guided for movement in an up and down direction. A hydraulic drive unit 4 serves to move the bending beam 3. Mounted on the bending beam 3 is the top element 5 of a bending tool assembly and in the form of a bending die 6. Matching the top element 5 is a bottom die 7 that is supported on a machine platen 8. A tactile bending angle sensor unit 9 is integrated into the top element 5 of the bending die 6. In terms of its design and functionality, the bending angle sensor unit 9 corresponds to the system described in U.S. Pat. No. 5,842,366. Mounted on the far side of the bending die 6, i.e., away from the operator of the bending machine 1, is a rear stop system generally designated by the numeral 10. Located on the opposite side is a system control unit in the form of a CNC controller generally designated by the numeral 11. In the operating state illustrated in FIG. 1 a beveling or bending process is completed by bending a workpiece generally designated by the numeral 12 so as to produce the angular sides or legs 13 and 14. As shown in FIG. 1, the workpiece 12 to be bent is held with a defined orientation between the top element 5 and the bottom die 7.

Figure 2:
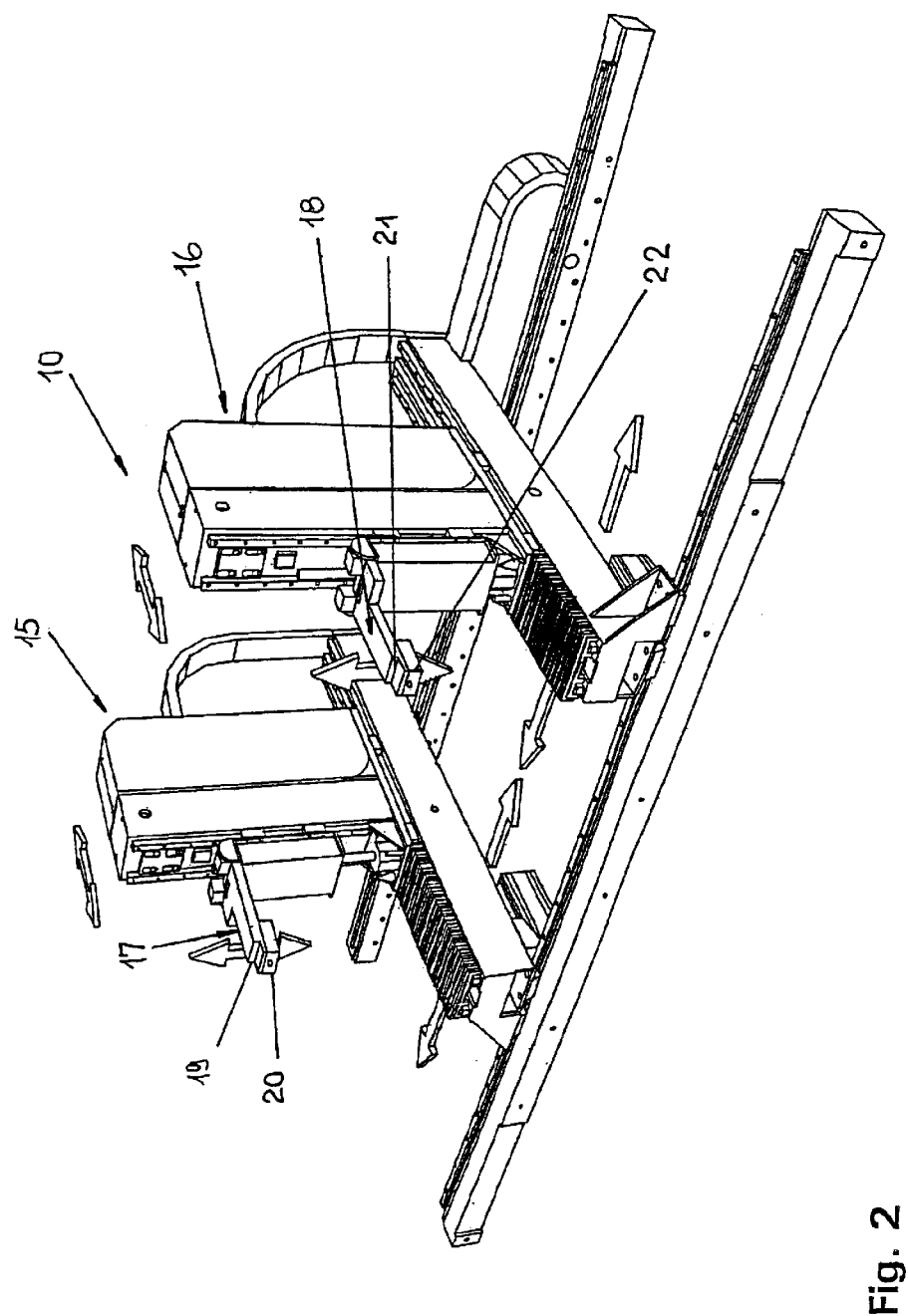
FIG. 2 is a perspective view of the rear stop system of the bending machine of FIG. 1 drawn to an enlarged scale.

FIG. 2 shows in detail that the rear stop system 10 encompasses two backstops generally designated by the numerals 15, 16, with the backstop 15 including a stop lug generally designated by the numeral 17, and backstop 16 having a stop lug generally designated by the numeral 18. These stop lugs 17, 18 constitute the positional stops for the flat workpiece that is to be bent and are independently adjustable in all three spatial directions. The movement of the stop lugs 17, 18 is controlled by the CNC controller 11. Underneath a workpiece support 19 of the stop lug 17 is equipped is mounted a camera 20. In corresponding fashion, underneath the work support 21 the stop lug 18 is equipped with a camera 22. The arrows in FIG. 2 indicate the directions in which the stop lugs 17, 18 can be moved.

Figure 3:
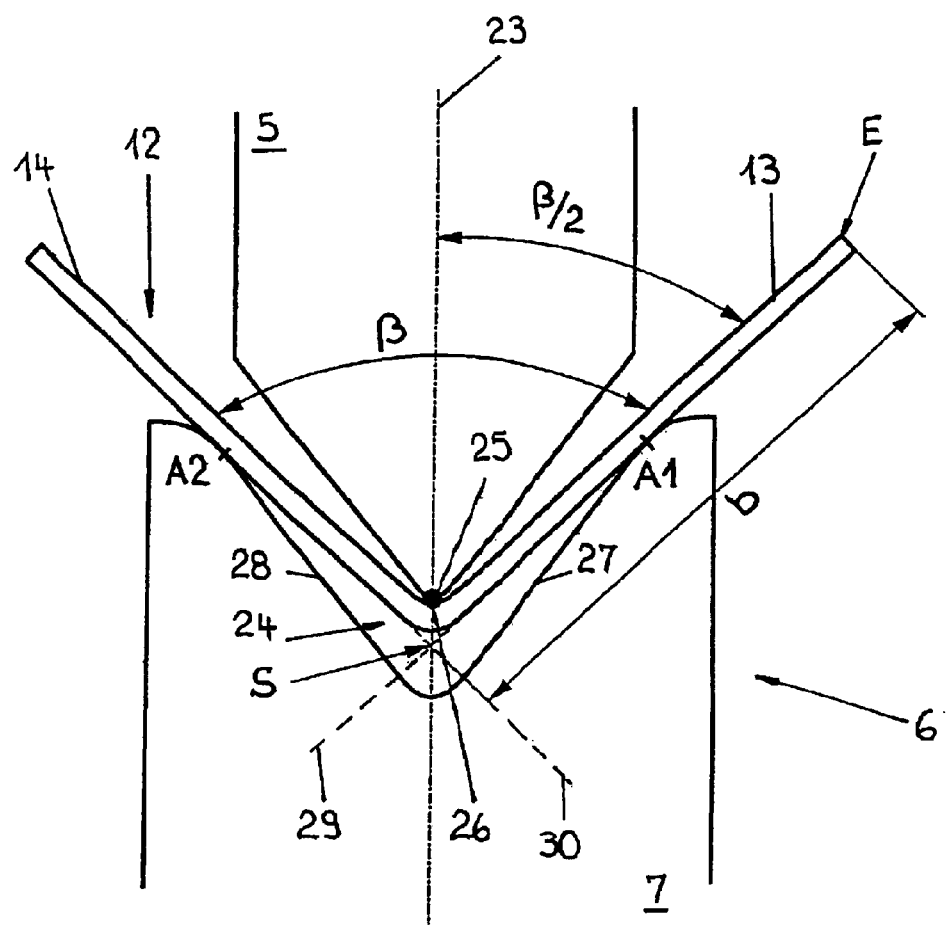
FIG. 3 is a schematic illustration showing the configuration of the bending die assembly of the bending machine of FIG. 1 with a workpiece disposed therein.

As shown in FIG. 3, the bending die 6 is symmetrically configured in terms of the bisector 23 of an angular groove 24 in the bottom die 7. The bisector 23 of the angular groove 24 coincides with the line bisecting the bending angle β that is formed between the legs 13, 14 of the workpiece 12. Accordingly, the size of the angle between the bisector 23 and each of the legs 13, 14 of the bent workpiece 12 is β/2. The tip 25 of the top element 5 strikes the upper surface of the workpiece 12 along a bending line 26. The lower surface of the workpiece 12 sits on the sides 27, 28 of the angular groove 24 of the bottom die 7 that forms the backing support for the workpiece 12. In FIG. 3, A1 and A2 represent the points of linear support of the workpiece 12 by the sides 27, 28 of the angular groove 24 of the bottom die 7.

As can be clearly seen in FIG. 3, the sides, i.e., the legs, 13, 14, of the bent workpiece 12 do not meet in ideal sharp angle fashion but along a radius at the point of their convergence. A straight projection 29 of the leg 13 and a straight projection 30 of the leg 14 intersect at a bending angle vertex S which, in the direction of the bisector 23, is located underneath the bent part 12. The length b of leg 13 extends between the vertex S and one end E of the leg.

For simplicity's sake, the bending angle contact sensor unit 9 which is integrated in the top element 5 of the bending die 6, has been omitted from FIG. 3. In traditional fashion, the bending angle sensor unit 9 may include two feeler disks of different diameters (not shown), which, when in operation, are in a symmetrical position relative to the bisector 23 and are in snug contact with the two legs 13, 14 of the workpiece 12. As another essential component, the bending angle sensor unit 9 includes a diagnostic processor (not shown) that determines the bending angle β on the basis of the difference between the radii of the two feeler disks and of the distance of the feeler disk center points in the direction of the bisector 23. In other words, the bending angle sensor unit 9 is a system that serves to determine the bending angle β.

Figure 4:
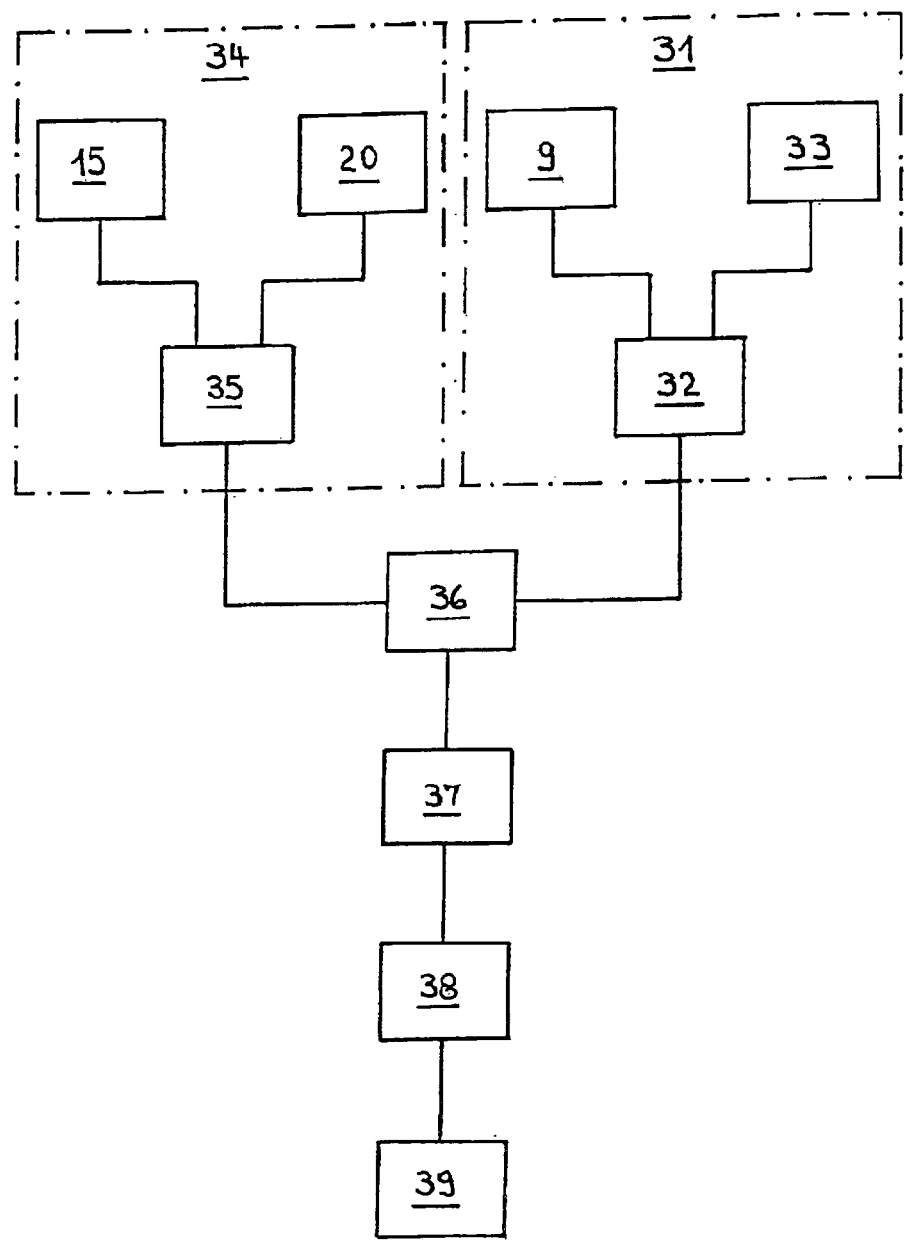
FIG. 4 is a schematic illustration of part of the numerical control system for the bending machine of FIG. 1.

As shown in FIG. 4, the bending angle sensor unit 9 is part of a processor system 31 for determining the position of the bending angle vertex S. The bending angle sensor unit 9 is connected to a processor 32 that has access to a memory module 33 in which the direction of the bisector 23 of the angular groove 24 in the bottom die 7 and the position of the support points A1, A2 on the sides 27, 28 of the groove 24 as a function of the bending angle β are stored. The sides 27, 28 of the angular bottom die groove 24 are thus a contributing feature of the system 31 for determining the position of the bending angle vertex S.

Based on the bending angle β determined by the bending angle sensor unit 9, the processor 32 calculates the angle β/2 under which extends the straight projection 29 of leg 13 of the workpiece 12 relative to the bisector 23 of the angular bottom die groove 24. From the angle β/2, the position of A1 and the direction of the bisector 23, the processor 32 now determines the position of the bending angle vertex S as the intersection of a straight line, touching the side 27 of the angular groove at A1 and extending under the angle β/2 opposite the bisector 23, with that bisector 23.

Also illustrated in FIG. 4 is a unit 34 for determining the end E of the leg 13, which unit includes the backstop 15 of the rear stop system 10 as well as the camera 20 which is mounted on the stop lug 17 of the backstop 15. The camera 20 serves as an image acquisition unit for capturing the position of the end E of the leg 13. The image acquired by the camera 20 of the end E is transferred to a processor 35 as electronic signals. The backstop 15, i.e., its motion control, is also connected to the processor 35. Since the camera 20 occupies a specific position on the stop lug 17, the position of the stop lug 17 determines the position of the camera 20. The positional information thus obtained and the signals emanating from the camera 20 allow the processor 35 to determine the position of the end E of the leg 13.

Using the stop lug 17 as a mount for the camera 20 is particularly desirable given the fact that, at the time at which the position of the end E is to be determined, the stop lug 17 is idle and thus freely available. The stop lug 17, i.e., its workpiece support 19, is used only at the beginning of the bending process, when the flat workpiece that is to be bent is positioned relative to the bending die 6 by being moved against the workpiece support 19 and, if necessary, against the workpiece support 21 of the stop lug 18. The stop lugs 17, 18 that serve as positioning stops ultimately define the direction of the bending line on the workpiece. During the beveling or bending process, the initially flat workpiece is lifted off the stop lugs 17, 18. Thus, for instance, the leg 14 of the workpiece 12, produced among others during the bending process, will be positioned above and at a distance from the stop lugs 17, 18, so that the latter are freely movable once the bending process has been initiated. In view of their triaxial movability, the stop lugs 17, 18 can occupy any spatial position and are thus able to move the camera 20 into any desired position. In particular, to avoid for instance parallactic errors, it is possible to orient the camera 20 in a viewing direction perpendicular to the end E of the leg 13. In addition or as an alternative to the camera 20, the camera 22 may be mounted on the backstop 16 as another image acquisition unit for the optical detection of the position of the end E. In that case the processor 35 will also access the motion control of the backstop 16.

Based on the position of the bending angle vertex S determined by means of the system 31 and the position of the end E of the leg determined by means of the unit 34, an evaluation unit 36, employing vectorial distance measuring techniques, calculates the length b of the leg as the distance between the bending angle vertex S and the end E. The actual linear length thus determined is compared in a comparator unit 37 with the predefined set point length stored in that unit. If the actual length deviates from the set point value for the length of the leg, that deviation is processed in a compensation module 38. In the machine illustrated, the compensation module 38 activates a servo drive 39 in the rear stop system 10.

In the event that bends are to be produced consecutively on different workpieces based on the same length set point values and the measured length b turns out to be shorter than that set point value, corresponding activation of the servo drive 39 will retract the rear stop system 10 relative to the bending die 6 by the amount determined in the compensation unit 38. If several bends are to be produced in the same workpiece, it is possible, for instance, in the case of a length deviation of the actual value detected on the first bend relative to the set point value, to take that into account in the setting of the rear stop system 10 for the second bending process. In this fashion it is possible to automatically ensure that the sum of the bends produced remains within the predefined overall tolerance.

The bending machine 1 also permits a positional determination of the bending angle vertex S and of the end E by a method different from that described above. For example, the bending angle β may also be calculated using a bending formula stored in the CNC controller 11. That bending formula describes the bending angle β as a function (i) of the geometry of the top element 5 and the bottom die 7, (ii) of the rigidity of the material, (iii) of the thickness of the blank to be bent, and (iv) of the depth of penetration of the top swage 5 into the bottom die 7. However, non-contact optical sensors may be used in lieu of the tactile bending angle sensor unit 9 in determining the bending angle β. To that effect, one could mount at least one of the cameras 20, 22 on the rear stop system 10. Conversely, the position of the end E can be measured using a tactile contact sensor unit. For example, at least one of the stop lugs 17, 18 may follow the end E in constant contact with the latter throughout the bending process. The position of the stop lug(s) 17, 18 would define the respective position of the end E.

Finally, it is possible to determine the position of the bending angle vertex S and/or the position of the end E by the so-called split beam method. The split beam method and its technical implementation are described for instance in German Patent No. 43 12 565 A1. In that case, at least one of the cameras 20, 22 of the rear stop system 10 may be positioned at a so-called triangulation angle to detect a light trace generated on the part 12 being bent.

Apart from making corrections for subsequent processing cycles, determining the length b of the legs can also serve to check the bent part 12 for deviations from its nominal three-dimensional geometry. For example, in the case of longer beveled parts the length b of the leg may be measured at several points along the bending line 26. An examination of the angle of the bent part 12 is equally feasible. The measurements obtained can in all cases be recorded automatically. If desired, the results of the corrections made by the compensation module 38 may be visually displayed.

Thus, it can be seen from the foregoing detailed description and the attached drawings that the method and apparatus of the present invention enable automated and accurate determination of the length of the legs of a workpiece being bent.

Having thus described the invention, what is claimed is:

1. A method for determining the length (b) of at least one of two legs (13, 14) of a workpiece (12) seated in a bending die (6), the legs having been bent toward each other by means of the bending die (6) at a bending angle (β) whose vertex (S) is located at the point of intersection of the straight, angle forming projections (29, 30) of the legs (13, 14) of the bent part (12), with one end (E) of the leg (13, 14) to be measured limiting the latter on the far side opposite the bending angle vertex (S), comprising:
   (a) holding the object part (12) in the bending die (6);
   (b) determining the position of the bending angle vertex (S) and the position of the end (E) of the leg (13, 14); and
   (c) from the respective position of the bending angle vertex (S) and of the end (E) thus determined, calculating the length (b) of the leg as the distance between the said bending angle vertex (S) and the said end (E).

2. The method for determining the length of at least one of two legs of a workpiece in accordance with claim 1 wherein the workpiece (12) is retained in the bending die (6) in a defined position.

3. The method for determining the length of at least one of two legs of a workpiece in accordance with claim 1 wherein the position of the bending angle vertex (S) is determined by initially determining the bending angle (β).

4. The method for determining the length of at least one of two legs of a workpiece in accordance with claim 1 wherein, during the step of determining the position of the bending angle vertex (S), the workpiece (12) is supported on a backing surface (27, 28) and the position of the bending angle vertex (S) is determined on the basis of the position in which the workpiece (12) is supported on said backing surface (27, 28).

5. The method for determining the length of at least one of two legs of a workpiece in accordance with claim 1 wherein the position of the bending angle vertex (S) is determined by measuring the bending angle (β) by optical means.

6. The method for determining the length of at least one of two legs of a workpiece in accordance with claim 1 wherein the position of the end of the leg (13, 14) of the workpiece (12) is determined by optical means.

7. A method for bending workpieces comprising the steps of
   (a) placing a workpiece in a bending die;
   (b) bending [two angular] two [angular] legs (13, 14) of a workpiece toward each other in the bending die (6) at a bending angle (β) to produce a bent workpiece (12) with two angular legs; and
   (c) determining the length (b) of at least one of the said legs (13, 14) [is determined] from the bending angle vertex (S) located at the point of intersection of the straight projections (29, 30) of the legs that form the bending angle (β) of the legs (13, 14) of the workpiece (12) and [with] from the end (E) of the leg (13, 14) delimiting the latter on the far side from the bending angle vertex (S).

8. The method for bending workpieces in accordance with claim 7 wherein the actual value obtained as a result of the determination of the length (b) of a leg (13, 14) is compared to a leg length set point value and that the result of said actual value/set point value comparison is used to define at least one parameter of significance for the length (b) in a subsequent bending step.

9. Apparatus for determining the length (b) of at least one out of two legs (13, 14) of a workpiece (12) seated in a bending die (6), the legs having been bent toward each other by means of the bending die (6) at a bending angle (β) whose bending angle vertex (S) is located at the point of intersection of the straight projections (29, 30) of the legs (13, 14) forming the angle (β) of the legs (13, 14) of the workpiece (12) while an end (E) of the leg (13, 14) concerned delimits the latter on the far side from the bending angle vertex (S), said apparatus including:
   (a) a system (31) for determining the position of the bending angle vertex (S);
   (b) a unit (34) for determining the position of the end (E); and
   (c) an evaluation unit (36), said system (31) and unit (34) permitting the determination of the position of the bending angle vertex (S) and the position of the end (E) of the bent workpiece (12) held in the bending die (6) in a defined position, and said evaluation unit (36)

processing data on the position of the bending angle vertex (S) and of the end (E) to determine the length (b) as the distance between the bending angle vertex (S) and the end (E).

10. The apparatus for determining the length of at least one of two legs (13, 14) of a workpiece in accordance with claim 9 wherein a retaining element is provided for the determination of the position of the bending angle vertex (S) and the determination of the position of the end (E), with the workpiece (12) being is held in specifically defined fashion in the bending die (6).

11. The apparatus for determining the length of at least one of two legs (13, 14) of a workpiece in accordance with claim 9 wherein the system (31) for determining the position of the bending angle vertex (S) includes a unit (9) serving to measure the bending angle ($\beta$) as well as a processor that connects to the unit (9) measuring the bending angle ($\beta$) and to the evaluation unit (36), said processor (32) determining the position of the bending angle vertex (S) on the basis of the bending angle ($\beta$) thus measured.

12. The apparatus for determining the length of at least one of two legs (13,14) of a workpiece in accordance with claim 9 wherein the system (31) for determining the position of the bending angle vertex (S) includes a processor (32) connected to the evaluation unit (36), and a backing surface (27, 28) supporting the workpiece (12) for the determination of the position of the bending angle vertex (S), said processor (32) determining the position of the bending angle vertex (S) on the basis of the position of the support for the workpiece (12) on the backing surface (27, 28).

13. The apparatus for determining the length of at least one of two legs (13,14) of a workpiece in accordance with claim 9 wherein the unit measuring the bending angle ($\beta$) is an optical measuring tool.

14. The apparatus for determining the length of at least one of two legs (13,14) of a workpiece in accordance with claim 9 wherein the unit (34) serving to determine the position of the end (E) includes a detection and acquisition unit (20, 21) for capturing the position of the end (E), and a processor (35) connected to the detection and acquisition unit (20,21) and also to the evaluation unit (36), said processor (35) determining the position of the end (E) on the basis of the position of the end (E) captured by the detection and acquisition unit (20, 21).

15. The apparatus for determining the length of at least one of two legs (13,14) of a workpiece in accordance with claim 14 wherein the detection and acquisition unit serving to capture the position of the end (E) may include a tactile contact sensor assembly that can be brought into contact with the end (E).

16. The apparatus for determining the length of at least one of two legs (13,14) of a workpiece in accordance with claim 15 wherein the contact sensor assembly that is in contact with the end (E) is capable of moving with the end (E) during the bending process.

17. The apparatus for determining the length of at least one of two legs (13,14) of a workpiece in accordance with claim 15 wherein the contact sensor assembly comprises a positioning stop lug (17, 18) for the workpiece to be bent.

18. The apparatus for determining the length of at least one of two legs (13,14) of a workpiece in accordance with claim 14 wherein the detection and acquisition unit (20, 21) serving to capture the position of the end (E) is an optical image acquisition unit (20, 21).

19. The apparatus for determining the length of at least one of two legs (13,14) of a workpiece in accordance with claim 9 mounted in a device for bending workpieces including a bending die (6) by means of which at least two legs (13, 14) of a workpiece can be bent toward each other to produce a bent workpiece (12) with a bending angle ($\beta$) whose bending angle vertex (S) is located at the point of intersection of the projections (29, 30) forming the angle ($\beta$) of the legs (13, 14) of the bent workpiece (12), and an end (E) of the respective leg (13, 14) delimiting the latter on the far side opposite the bending angle vertex (S), and, additionally, a system for determining the length (b) of a leg (13,14).

20. The apparatus for determining the length of at least one of two legs (13,14) of a workpiece in accordance with claim 19 wherein the bending die (6) itself serves as the retaining element for the defined placement of the workpiece (12) for the determination of the bending angle vertex (S) and/or for the determination of the position of the end (E).

21. The apparatus for determining the length of at least one of two legs (13,14) of a workpiece in accordance with claim 20 wherein a backing surface (27, 28) supporting the workpiece (12) for the determination of the position of the bending angle vertex (S) is provided by the bending die (6).

22. The apparatus for determining the length of at least one of two legs (13,14) of a workpiece in accordance with claim 21 wherein a contact sensor assembly in the detection and acquisition unit (34) serving to capture the position of the end (E) is constituted of a positioning stop (17, 18) of the bending device against which the workpiece can be set for appropriate positioning relative to the bending die (6) prior to being processed.

23. The apparatus for determining the length of at least one of two legs (13,14) of a workpiece in accordance with claim 22 an optical detection and acquisition unit (20, 21) for capturing the position of the end (E) is at least in part mounted on a positioning stop (17, 18) of the bending device.

24. The apparatus for determining the length of at least one of two legs (13,14) of a workpiece in accordance with claim 23 wherein the positioning stop (17, 18) is preferably movable by the control system (11).

25. The apparatus for determining the length of at least one of two legs (13,14) of a workpiece in accordance with claim 24 wherein, for determining the length (b) of a leg, said evaluation unit (36) as a part of a system controller (11) in which at least one set point value for the length (b) is stored and by means of which an actual length value can be compared against a length set point value, and, on the basis of the result of the actual versus set point length comparison, at least one parameter controlling the length (b) in at least one subsequent bending operation can be defined.

* * * * *